United States Patent [19]
Danne et al.

[11] Patent Number: 5,946,381
[45] Date of Patent: Aug. 31, 1999

[54] CONTROLLING INCOMING CALLS VIA THE WORLD-WIDE WEB

[75] Inventors: Anders Olof Danne, Kista; Göran Båge, Saltsjöbaden; Hans Hall, Studentvägen, all of Sweden

[73] Assignee: Telefonaktiebolaget L M Ericsson (publ), Stockholm, Sweden

[21] Appl. No.: 08/995,171

[22] Filed: Dec. 19, 1997

[51] Int. Cl.$^6$ .................................................. H04M 3/42
[52] U.S. Cl. ........................... 379/142; 379/215; 370/352
[58] Field of Search .................... 379/127, 142, 379/215, 90.01, 93.01, 93.09; 370/352, 485, 389, 392

[56] References Cited

U.S. PATENT DOCUMENTS

| | | | |
|---|---|---|---|
| 5,263,084 | 11/1993 | Chaput et al. | 379/215 |
| 5,533,102 | 7/1996 | Robinson et al. | 379/215 |
| 5,533,110 | 7/1996 | Pinard et al. | 379/201 |
| 5,625,676 | 4/1997 | Greco et al. | 379/88 |
| 5,649,002 | 7/1997 | Brady et al. | 379/215 |
| 5,805,587 | 9/1998 | Norris et al. | 379/215 |

FOREIGN PATENT DOCUMENTS

| | | |
|---|---|---|
| WO 97/20424 | 6/1997 | WIPO . |
| WO 97/26749 | 7/1997 | WIPO . |
| WO 97/37483 | 10/1997 | WIPO . |
| WO 97/47118 | 12/1997 | WIPO . |
| WO 98/01985 | 1/1998 | WIPO . |

OTHER PUBLICATIONS

Colin Low; The Internet Telephony Red Herring; May 15, 1996; pp. 1–15.

R. Babbage, I. Moffat, A. O'Neill and S. Sivaraj; Internet phone —changing the telephony program?; BT Technol J, vol. 15, No. 2, Apr. 1997; pp. 145–157.

M. Fridisch, G. de Jabrun, I. Pinot; Terminals for Accessing the Internet—The Internet Telephone; Alcatel Telecommunications Review—4th Quarter 1996; pp. 304–309.

*Primary Examiner*—Paul Loomis
*Attorney, Agent, or Firm*—Jenkens & Gilchrist, P.C.

[57] ABSTRACT

A method and system are disclosed in which an incoming call is routed to a service node with a World-Wide Web interface. In a preferred embodiment, responsive to an incoming call, an "alert" software routine is executed in the service node, which sends an alert message to a Java software application residing in the called party's terminal (e.g., personal computer, etc.). The Java application causes a window to be displayed on the called party's terminal, which shows pertinent information about the calling party. The displayed window also contains "buttons" that allow the called party to choose (at a minimum) whether to accept the call, reject the call, hold the call, or re-direct the call to another phone.

7 Claims, 2 Drawing Sheets

CONTROLLING INCOMING CALLS VIA THE WORLD-WIDE WEB

BACKGROUND OF THE INVENTION

1. Technical Field of the Invention

The present invention relates in general to the telecommunications field and, in particular, to a method and system for controlling incoming phone calls using the World-Wide Web (WWW).

2. Description of Related Art

Incoming telephone calls are normally indicated by a ring signal without any accompanying information. Consequently, a telephone subscriber basically has two choices in responding to an incoming call, either answer the call or disregard it. Caller ID and other types of telephone number indicators (e.g., a calling party or A-number indicator) provide additional caller information to the subscriber, and telephone answering machines provide yet another way to identify callers.

A problem with ordinary telephones is that subscribers are alerted to incoming calls with a ring signal only. The more advanced telephones can include displays that show the calling party's telephone number. However, most subscribers use telephones without such displays. Consequently, if such a subscriber is otherwise occupied when an ordinary telephone rings, the only practical options available are to answer or not answer the call. There is no real polite way the subscriber can refuse to answer the call, leave a message stating that the call will be returned at a later time, or re-direct the call to another phone. The latter action could be necessitated, for example, if the subscriber was using the telephone connection for Internet browsing, and that line was occupied and thus "busy" for the incoming calls. As described below, the present invention successfully resolves this problem.

SUMMARY OF THE INVENTION

A method and system are provided whereby an incoming call is routed to a service node with a World-Wide Web (WWW) interface. In a preferred embodiment, responsive to an incoming call, a call "alert" software routine is executed in the service node, which sends an alert message to a Java software application residing in the called party's terminal (e.g., personal computer, etc.). The Java application causes a window to be displayed on the called party's terminal, which shows pertinent information about the calling party. The displayed window also contains "buttons" that allow the called party to choose (at a minimum) whether to accept the call, reject the call, hold the call, or re-direct the call to another phone.

An important technical advantage of the present invention is that if a called party is using the phone connection to browse the Internet, the called party can elect whether to answer the incoming call, or direct the incoming call to another phone and/or an answering machine.

Another important technical advantage of the present invention is that a called party can be given enough information about a calling party to be able to decide whether or not to answer an incoming call.

Another important technical advantage of the present invention is that a called party can screen and reject unwanted incoming calls.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
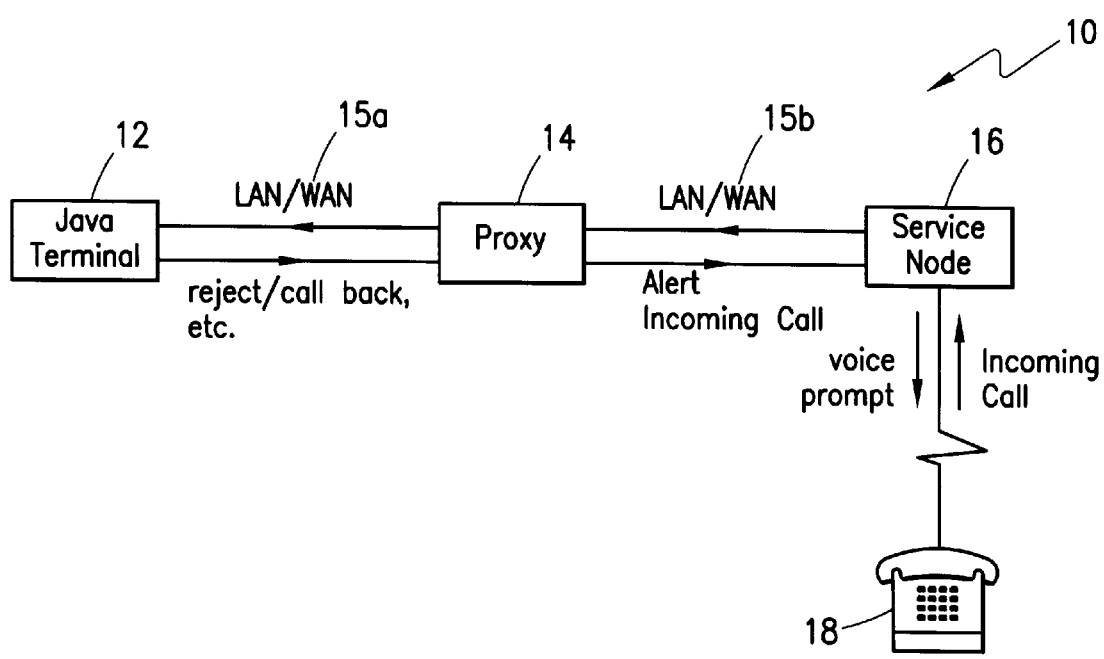
FIG. 1 is a simplified block diagram of an exemplary system that can be used to implement a preferred embodiment of the present invention.
Figure 2:
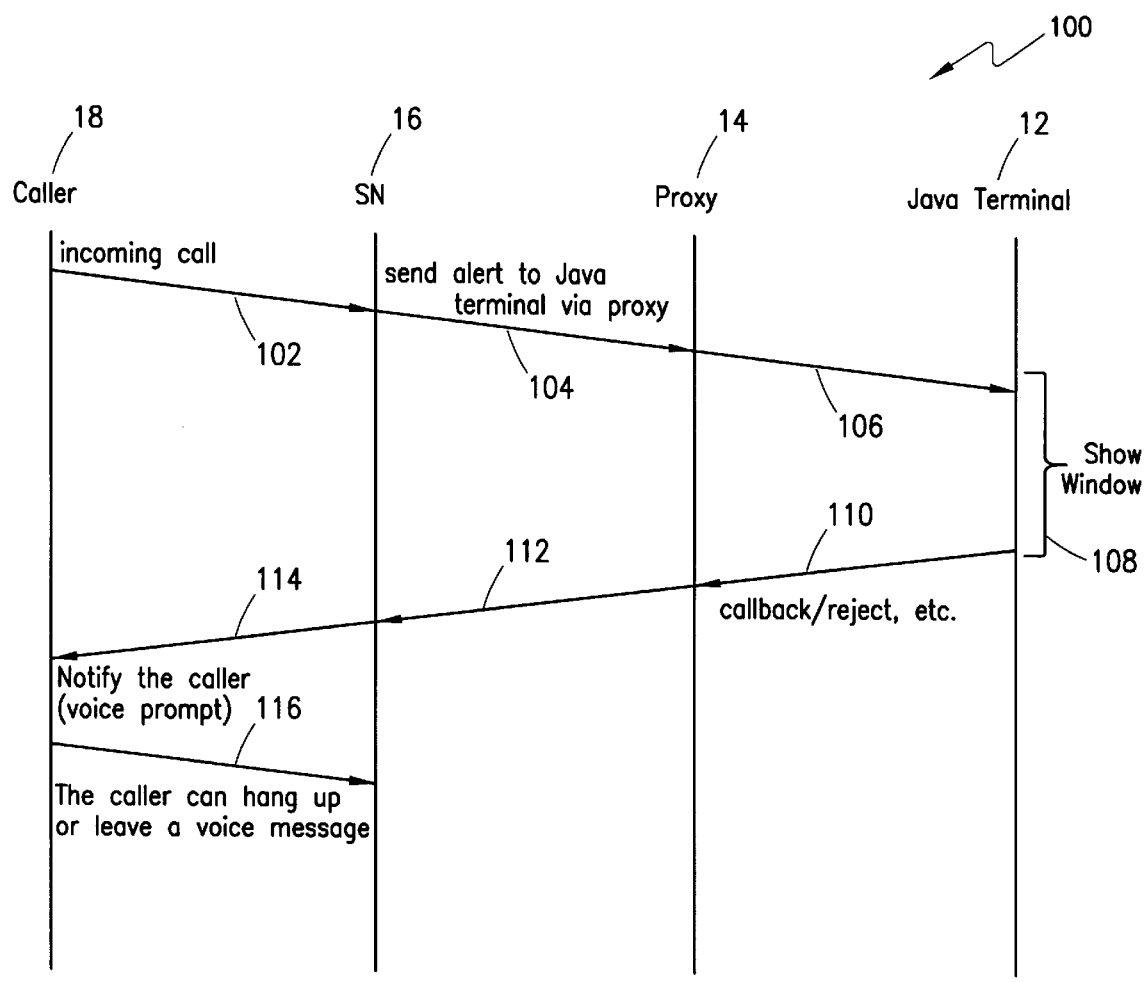
FIG. 2 is a time sequence diagram that illustrates an exemplary method that can be used with the system of FIG. 1 to implement the preferred embodiment of the present invention.

The preferred embodiment of the present invention and its advantages are best understood by referring to FIGS. 1–2 of the drawings, like numerals being used for like and corresponding parts of the various drawings.

FIG. 1 is a simplified block diagram of an exemplary system (10) that can be used to implement a preferred embodiment of the present invention. FIG. 2 is a time sequence diagram that illustrates an exemplary method (100) that can be used with the system (10) of FIG. 1 to implement the preferred embodiment of the present invention. Referring to FIGS. 1 and 2, exemplary system 10 includes a service node (e.g., a server or comparable equipment including a digital processor) 16 with an interface to a network connection, such as, for example, a local area network (LAN) connection, or wide area network (WAN) connection) 15b. For this embodiment, the network connection 15b (and/or 15a) preferably represents an Internet or WWW interface and/or connection.

At step 102 of method 100, a caller (A-party or calling party) represented by a fixed telephone 18 (preferably in a Public Switched Telephone Network or PSTN) makes a call using the telephone number of the subscriber (called party, B-party, party, or user) of the network associated with the service node 16. For this embodiment, the network associated with the service node 16 is a cellular Public Land Mobile Network (PLMN), but the type of network involved should not be construed to limit the scope of the invention. The PSTN routes a call to the PLMN via a mobile services switching center (MSC) in the PLMN. In response to the incoming call, the service node 16 detects the A-number (e.g., A-party's or calling party's telephone number) from the incoming call information, and retrieves additional information about that calling party from a local (or remote) database. For example, the retrieved calling party information can include the calling party's name, company name, logo, address, etc. As such, any pertinent calling party information that will allow a called party to decide whether or not to accept an incoming call can be included and retrieved from the database. The service node also detects the B-number (e.g., B-party's or called party's telephone number) from the incoming call information, and accesses the database to determine if the called party is known, and preferably, a subscriber to an incoming call "alert" service, which is essentially the service being described herein.

At step 104, if the called party is known and a subscriber to the call "alert" service, the service node 16 sends an "alert" message to the called party's terminal 12, which preferably includes (at a minimum) the calling party's name and telephone number. For this embodiment, the calling party's terminal 12 is a personal computer executing Java application software, for example, JAVA 1.1.5, which was released on Dec. 9, 1997. As such, the terminal 12 also includes Internet browsing software. Consequently, for example, the Java application can be downloaded to the terminal 12 from the service node 16, or uploaded to the terminal 12 from a CD-ROM or similar medium provided by the call "alert" service provider (e.g., an Internet Service Provider or ISP). However, although the exemplary embodiment being described herein utilizes Java application software, the present invention is not intended to be so limited and can be implemented with any other appropriate software language.

Returning to step 104, when the service node detects the B-number and thereby identifies the called party, the database can also be searched to determine where the incoming call can be placed (e.g., via the call "alert" service, a subscriber can temporarily designate an appropriate phone number at a certain location for receiving calls, such as in a residence, at work, or in a motor vehicle, etc.).

At step 106, for this embodiment in which Java software is used, a "proxy" server (or similar equipment) 14 is used to route the "alert" message to the called party's terminal 12. A Java proxy 14 is needed in this routing path, because when messages are sent in the other direction (i.e., from the Java terminal 12 to the service node 16), a security restriction imposed on conventional browsers that support Java is that a Java program is not allowed to be connected to any machine other than the machine from which the Java program was downloaded. Consequently, for this embodiment, if the service node 16 is not the same device as the WWW-server from which the Java application was downloaded to the terminal 12, then the proxy server 14 is used to simulate that connection. The call "alert" message is routed from the proxy server 14 to the terminal 12 via a LAN, WAN or Internet connection 15a.

At step 108, when the (Java) software in the called party's terminal 12 receives the call "alert" message from the service node 16, an alert handler routine notifies an object (program) that is used to create an "incoming call" window, which responds by opening a window in the terminal's display that contains the pertinent information about the calling party. The "incoming call" window displayed by the terminal 12 can also contain "buttons" that allow the called party to choose, for example, whether to accept the call, reject the call, hold the call, or re-direct the call to another phone. Another option for the "incoming call" window can include a "button" that allows the called party to receive the call with equipment operating in accordance with the Internet Protocol (IP). Consequently, the called party can use the speakers and microphone associated with the terminal 12 (e.g., a multi-media personal computer) to complete the call.

At step 110, after the called party has "pressed" one or more of the above-described selection "buttons", the selection information is conveyed back to the service node 16 via the proxy server 14 (step 112), which handles the incoming call as directed by the selection information.

At step 114, if the called party elects not to answer the incoming call, the service node 16 can send a (voice prompt) message (e.g., generated by an announcement machine) to the calling party's telephone 18, which appropriately (and preferably politely) notifies the calling party about the selection made (e.g., called party does not answer, please call back, etc.). At step 116, if so desired, the calling party can respond, for example, by leaving a voice message with the service node 16, or hanging up and disconnecting the call.

For this embodiment, as discussed earlier, the called party (e.g., a client or subscriber for the call "alert" service, and/or user of the Java terminal 12) can initiate this service by browsing to a web page on the WWW where this service can be found. When the client accesses this web page, a Java applet including the call "alert" routines is downloaded from the web server to the client's terminal (12). The web server can be a part of the service node 16, or there can be an interface connection between the service node 16 and the web server used. For the latter situation, a proxy server is used to forward data from the web server to the service node, because (as explained earlier) the standard browser protocols require that a Java applet is only allowed to connect to the server where the applet originated. However, an alternate but secure approach would be to download a "signed" applet that is allowed to be connected to any site recognizing and authenticating the signature.

In order to initiate the incoming call "alert" service, the client (user of terminal 12) is preferably identified to the service node 16. This function can be accomplished by the client using a "trusted" terminal (12) that is recognized by the service node, or providing a user ID and password that the browser can convey from the terminal 12 to the service node. As such, once the service node authenticates the client's user ID and password (information maintained for comparison in the service node's database), the service node can initiate the incoming call "alert" service for that terminal.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for alerting a called party to an incoming call, comprising the steps of:
   establishing a call connection between a terminal associated with said called party and a service node through an Internet;
   downloading a JAVA application associated with an alert service to said terminal from a web server associated with said service node;
   providing, by said terminal, an identification key to said service node;
   initiating, by said service node, said alert service when said identification key is provided;
   receiving said incoming call for said called party by said service node when said terminal is connected to the Internet;
   retrieving, by said service node, calling party information associated with said incoming call;
   sending, by said service node, an alert signal including said calling party information to said JAVA application within said terminal;
   processing, by said JAVA application, said alert signal including said calling party information; and
   displaying, by said JAVA application, said alert signal including said calling party information on said terminal.

2. The method of claim 1, wherein the sending step comprises sending said alert signal to said terminal via a proxy server.

3. The method of claim 2, further comprising the step of sending a response to said alert signal from said terminal to said service node via said proxy.

4. The method of claim 1, further comprising the step of sending a response to said alert signal from said terminal to said service node.

5. A system for alerting a called party to an incoming call, comprising:

a terminal, associated with said called party, having a call connection to an Internet, said terminal having a JAVA application associated with an alert service therein for processing and displaying a received alert signal on said terminal;

a service node operatively connected to said terminal through the Internet for receiving an identification key from said terminal, initiating said alert service based upon said identification key, receiving said incoming call to said called party when said terminal has said call connection to the Internet, retrieving calling party information associated with said incoming call and sending said alert signal including said calling party information to said JAVA application within said terminal; and a web server associated with said service node for downloading said JAVA application to said terminal when said terminal has said call connection to the Internet.

6. The system of claim 5, further comprising means for said party to respond to said alert signal without disrupting said call connection to the Internet.

7. The system of claim 5, further comprising a proxy server for routing said alert signal from said service node to said terminal.

* * * * *

UNITED STATES PATENT AND TRADEMARK OFFICE
CERTIFICATE OF CORRECTION

PATENT NO. : 5,946,381
DATED : Aug. 31, 1999
INVENTOR(S) : Danne et al.

It is certified that error appears in the above-identified patent and that said Letters Patent is hereby corrected as shown below:

Column 2, line 35  After "B-party,"
Remove --party,--

Signed and Sealed this

Third Day of April, 2001

Attest:

NICHOLAS P. GODICI

*Attesting Officer*  *Acting Director of the United States Patent and Trademark Office*